(12) United States Patent
Weynant

(10) Patent No.: US 7,377,703 B2
(45) Date of Patent: May 27, 2008

(54) FLEXIBLE FERRULE DEVICE FOR CONNECTION OF OPTICAL FIBER AND USE THEREOF

(75) Inventor: Eric Weynant, Outremont (CA)

(73) Assignee: 9134-9001 Quebec Inc., Montreal, Quebec (CA)

( * ) Notice: Subject to any disclaimer, the term of this patent is extended or adjusted under 35 U.S.C. 154(b) by 0 days.

(21) Appl. No.: 10/576,888

(22) PCT Filed: Oct. 21, 2004

(86) PCT No.: PCT/CA2004/001855

§ 371 (c)(1),
(2), (4) Date: Apr. 24, 2006

(87) PCT Pub. No.: WO2005/040876

PCT Pub. Date: May 6, 2005

(65) Prior Publication Data

US 2007/0031090 A1    Feb. 8, 2007

(30) Foreign Application Priority Data

Oct. 24, 2003   (CA) .................................. 2446533

(51) Int. Cl.
*G02B 6/255* (2006.01)
(52) U.S. Cl. .................... 385/99; 385/95; 385/97; 385/98
(58) Field of Classification Search .................. 385/99
See application file for complete search history.

(56) References Cited

U.S. PATENT DOCUMENTS

| | | | |
|---|---|---|---|
| 4,094,580 A | 6/1978 | Cook et al. | 385/64 |
| 4,483,584 A | 11/1984 | Gresty | 385/64 |
| 5,121,456 A | 6/1992 | Essert et al. | 385/70 |
| 5,307,431 A | 4/1994 | Mehadj et al. | 385/72 |
| 5,768,455 A | 6/1998 | Konik | 385/86 |
| 6,357,933 B1 * | 3/2002 | Bradley et al. | 385/81 |
| 6,416,236 B1 | 7/2002 | Childers et al. | 385/84 |
| 6,533,469 B1 | 3/2003 | Nakamura et al. | 385/84 |

(Continued)

FOREIGN PATENT DOCUMENTS

DE   27 54 347 C2   6/1979

(Continued)

OTHER PUBLICATIONS

International Search Report dated May 6, 2005.

*Primary Examiner*—Frank G. Font
*Assistant Examiner*—Ryan Lepisto
(74) *Attorney, Agent, or Firm*—Bromberg & Sunstein LLP

(57) ABSTRACT

The present invention is directed to a connector assembly for connecting optical fibers in optical communication systems, and particularly to flexible ferrule device for connecting optical fibers for such use. The present invention further relates to a method of connecting optical fiber using such device and to a tool for the use thereof.

The invention relates to an optical fiber connection device that allows for the end-to-end alignment of two optical fibers in a way such as to permit a light signal to pass from one fiber to the other fiber with minimal attenuation and reflection losses. This device also makes it possible to reduce any air layer between the ends of the two fibers in contact by maintaining pressure on their ends.

16 Claims, 5 Drawing Sheets

U.S. PATENT DOCUMENTS

| | | | |
|---|---|---|---|
| 6,579,015 B2 | 6/2003 | Lampert | 385/78 |
| 7,066,656 B2 * | 6/2006 | Demissy et al. | 385/55 |
| 2002/0037140 A1 | 3/2002 | Ishibashi et al. | 385/78 |

FOREIGN PATENT DOCUMENTS

| | | |
|---|---|---|
| DE | 198 30 358 A1 | 1/1999 |
| EP | 104820 B1 | 4/1984 |
| EP | 0 373 340 B1 | 6/1990 |
| EP | 1148366 A2 | 10/2001 |
| EP | 1148366 B1 | 4/2006 |
| JP | 52-077736 | 6/1977 |
| JP | 01302209 A | 12/1989 |
| JP | 03130706 | 6/1991 |
| JP | 04 006507 | 1/1992 |
| JP | 2001/194554 A | 7/2001 |
| JP | 2002311293 A | 10/2002 |
| WO | WO2004/015473 | 2/2004 |

* cited by examiner

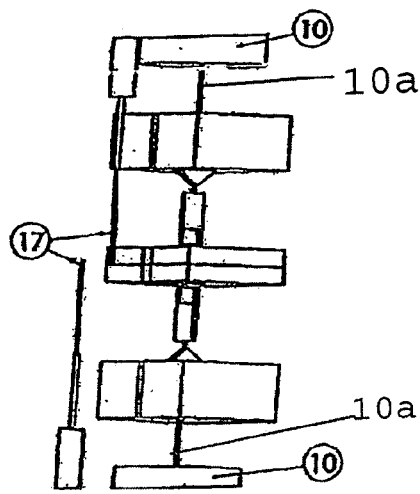
Figure 5a
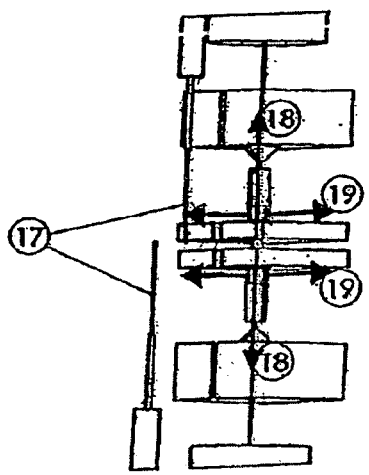
Figure 5b
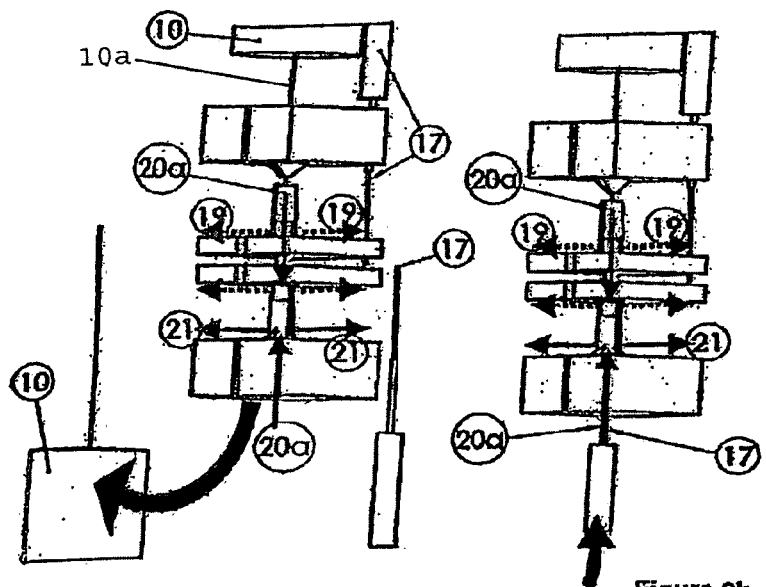
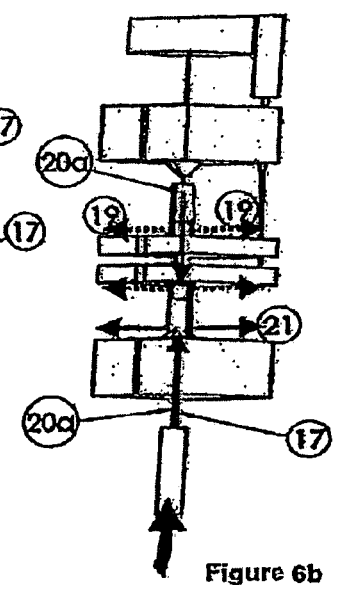
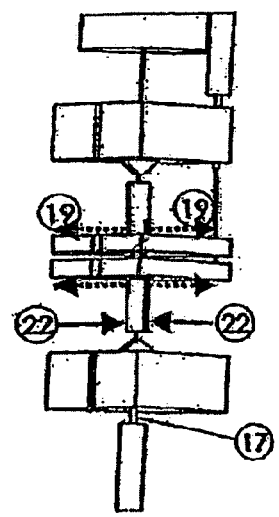
Figure 6a
Figure 6b
Figure 6c

FLEXIBLE FERRULE DEVICE FOR CONNECTION OF OPTICAL FIBER AND USE THEREOF

BACKGROUND OF THE INVENTION

The present invention is directed to a connector assembly for connecting optical fibers for use in optical communication systems, and particularly to a flexible ferrule device for connecting optical fibers for such use. The present invention further relates to a method of connecting optical fibers using such a device and to a tool for use thereof.

The invention relates to an optical fiber connection device that allows for the end-to-end alignment of two optical fibers in a way such as to permit a light signal to pass from one fiber to the other fiber with minimal attenuation and reflection losses. This device also makes it possible to reduce any air layer between the ends of the two fibers in contact by maintaining pressure on their ends.

Ferrules and related technology are known in fiber optic connection. The art is replete with examples, including U.S. Pat. Nos. 6,579,015; 6,533,469; 6,416,236; 6,357,933 and U.S. Patent Application Publication No. 2002/0037140 entitled "Composite Ferrule of Connector for Optical Fibers and Methods of Manufacturing same". A ferrule for use as a connector in an assembly with optical fibers requires high dimensional accuracy and precision, yet in an extremely small-diameter conduit for positioning and holding optical fiber. Present or proposed ferrule connectors for optical fibers, such as U.S. Pat. No. 6,357,933 to Lucent Technologies Inc. may not be amenable to ease of manufacture or assembly with optical fiber by the technical personnel carrying out the operation. Thus, in spite of the known application of ferrules in optical fiber connection, there is a continuing need for improvement in the technology of the design and use of ferrules for this purpose. For example, relating to aspects of attenuation and return loss, the establishing of as perfect as possible fiber-to-fiber contact between end portion of optional fibers and the prevention of face dust accumulation between the fiber faces. There is also a need to improve the ease of use of ferrules in an assembly for connection of optical fibers in an optical communication system, by the person carrying out the operation.

Optical fibers are generally made of glass or polymers and are made of successive and concentric layers. At the inner centre of the fiber, one can find the core of the fiber. The core is surrounded by the cladding. Both constitute the waveguide that will conduct light. They are made of glass for better performance, and thus they are fragile.

The cladding is generally coated with a polymer layer that protects the glass from scratches and allows the optical fiber to bend, or to exert tensile strength on it. The last layer of protection is called the buffer.

For example, the diameter of the core can be between 6 to 60 µm and the diameter of the cladding is generally 125 µm, but can be 50 µm to 200 µm. The buffer diameter is generally 250 µm for fibers to be assembled in a cable with other optical fibers. If used alone, a fiber will receive a 900 µm buffer made of different layers to protect glass and polymers from water and sunlight.

In the field of photonics, optical fibers are used for the transmission of optical signals as well as for the linking of optical switches, waveguide grating devices, optical amplifiers, modules and the like. Optical transmission systems relying on photonics have been taking on greater importance, as optical signals are capable of carrying a far larger quantity of information as compared to typical copper wire communication systems. For example, with the technology of Dense Wavelength Division Multiplexing (DWDM) and Demultiplexing it is possible to transmit multiple wavelengths in a single fiber, providing data capacities of 40 Gigabits per second and greater.

Optical networks which require DWDM equipment and other such devices demand multiple amounts of splices and connectors. Splicing and connecting play a significant role in network cost and performance. Although mechanical splicing of optical fibers may be sufficient where there is no requirement for frequent connection and disconnection, current technologies for connectors or for splicing are still time consuming and expensive, since they are difficult to miniaturize and to manipulate. As well, there will be circumstances where connectors will be used in applications where flexibility for routing or reconfiguration is necessary or for connection of an end use device, such a computer or other electronic devices to a fiber or to other such devices. Current technologies for connectors or for splicing are still time consuming and expensive, since they are difficult to miniaturize and to manipulate.

As poor connection between the ends of two optical fibers will lead to signal distortion and loss of strength, a number of approaches have been proposed for proper optical fiber connections which will provide a good signal conduction. One such approach is set out in our international patent application entitled "A Connector for Optic Fibers" and published as WO 2004/015473. This application is incorporated herein by reference in its entirety.

In our aforesaid application, we propose a connector for connecting the ends of two optical fibers by abutment, wherein the connector is divided into a plurality of fingers, that extend longitudinally at each end and a fiber conduit extending from the first end to the second end. Such a connector is manufactured from Shape Memory Material (SMM), such as polymers, ceramics, or a metal alloys. In general, such materials when deformed at low temperature from a rest condition by mechanical deformation will then be biased to return to the rest condition when one heats them up over a temperature specific to the material used.

Use of such an optical fiber connector as described above is however not totally satisfactory as during the step of cooling or release of stress, there may be a tendency for the connector to push the ends of the optical fibers apart slightly. This makes it necessary during the operation of connecting optical fibers ends to include an additional step of restraining the optical fibers in a fixed position during the step where the connector returns to its original size, to prevent the optic fibers from being moved apart on the heating of the connector. Accordingly, some form of fixed clamping is required, of the buffer that typically covers and protects an optical fiber or bundle of such fibers to prevent axial movement of the optic fibers being connected. Such a step is cumbersome to the easy and quick connection of optical fibers using an aforesaid connector, requiring a certain degree of operational skill on the part of the technician carrying out the operation.

Although a Shape Memory Material (SMM) connector, as described in our international patent application published as WO 2004/015473, provides an improved means for connecting optical fibers, this still requires the use of certain operational skill by a technician carrying out the operation. As well, there is a need for improvement, such as in attenuation and return loss, fiber-to-fiber contact, dust accumulation and the like, in relation to optical fiber connection with ferrules, despite the common use of such technology in the field of optical signal transmission. Thus, there is a continuing need for an optical fiber connector assembly that is simple and quick to install and use and to maintain a good signal conduction between optical fibers, as well for a connection to be made and provided at a near end use device.

For purposes of the present application, with respect to Shape Memory Material (SMM), reference may be made to AFNOR Standard "Alliages à mémoire de Forme—Vocabulaire et Mesures" A 51080-1990, herein incorporated entirely by reference.

Shape Memory Materials (SMM) are characterized by the following behaviour when the material is below a temperature (Mf), which is a property dependent on the particular SMM, it is possible to strain (deform) the material. The strain is quite easily obtained by stressing the material with a relatively low stress. When stress is released, SMM retains the greatest part of the strain. When the SMM is heated above a second temperature (Af), which is also dependent on the particular SMM, the SMM will recover the strain. The recovery of strain is total unless the stress used to deform SMM exceeds the yield strength of the material. Thus, depending on the SMM, maximum recoverable strain reaches eight to ten percent. This shape memory phenomenon can be used to move or to stress other parts. During heating above (Af), the SMM can exert a strength. In such a way, strain recovery will be reduced, depending on the strength exerted. The higher the strength, the more the strain recovery will be partial.

At a very high strength, strain recovery will be null. If unstressed, the SMM will tend towards total recovery of its original shape. SMM also exhibits a pseudo-elastic properties coming from its shape memory characteristics. Pseudo elastic property is also referred togas super elastic effect.

The pseudo-elasticity results from the following phenomenon: when the SMM is at a temperature greater than (Af), it can be strained at particularly high rates, that is exhibiting unusual elasticity, arising from the shape MEMORY properties. Initially, when the SMM is stressed the strain will increase linearly, as in an usual elastic material.

However, at an amount of stress, called Sms, which is dependent on the particular SMM and temperature, the ratio of strain to stress is no longer linear, since strain increases at a higher rate as stress increases at a lower rate. At a higher level of stress, the increase in strain will tend to become smaller. On the release or reduction of stress, the reduction in strain will follow a different curve from the one manifested as stress was increased, in the manner of a hysteresis like loop.

An example of such an above material would be a shape memory alloy (SMA). Examples concerning activation of the shape memory element in a SMA include D. E. Muntges et al., "Proceedings of SPIE", Volume 4327 (2001), pages 193-200 and Byong-Ho Park et al., "Proceedings of SPIE", Volume 4327 (2001), pages 79-87. Miniaturized components of SMA may be manufactured by laser radiation processing. See, for example, H. Hafer Kamp et al., "Laser Zentrum Hanover e.v.", Hanover, Germany [publication]. All of the above references are incorporated herein by reference.

Materials, which are suitable for the present invention, will illustrate pseudo elastic effect. SMM technology is particularly suited to optical fiber connection, as it offers:

a) a high strain capability allowing a sufficient enlargement of the bore diameter to freely insert the optical fibers;

b)-mechanical retention of fibers; and c) allows to create a strength of abutment between the faces of fibers.

The ferrule may, for example, be made from a shape memory polymeric material, such as isostatic polybutene, shape memory ceramics such as Zirconium with some additions of Cerium Beryllium or Molybdenum, or shape memory alloys: Copper alloys including binary and ternary alloys, such as Copper-Aluminium alloys, Copper-Zinc alloys, Copper-Aluminium-Beryllium alloys, Copper-Aluminium-Zinc alloys and Copper-Aluminium-Nickel alloys, Nickel alloys such as Nickel-Titanium alloys and Nickel-Titanium-Cobalt alloys, Iron alloys such as Iron-Manganese alloys, Iron-Manganese-Silicon alloys, Iron-Chromium-Manganese alloys and Iron-Chromium-Silicon alloys, Aluminum alloys, and high elasticity composites which may optionally have shape memory metallic or polymeric reinforcement.

With respect to the present invention, two optical fibers must be prepared so that the buffer is retrieved on a sufficient length to allow the ferrule to keep the claddings and cores in front of each other. A cleaving tool will advantageously cleave the ends of the optical fibers such that the extremities are flat and nearly perpendicular.

To connect the ends of two optical fibers using the ferrule connector, the connector must be first deformed to enlarge the diameter of its bore, which in its rest position is slightly smaller than the optical fibers. One end of the optical fiber is inserted into the bore of the ferrule and then a second optical fiber is inserted into the other end of the bore of the ferrule until the fibers face one another. An optical gel may also be applied, which have substantially of the same index of refraction as the optical fibers to assure uniform optical properties across the connection between the fibers.

Once the optical fibers ends are fully inserted into the connector, and the respective ends abut, the force applied on the connector may then be released and the connector allowed to shrink on the inserted fibers. Upon release of the force on the connector, the connector will then tend to exert a controlled compressive force on the optical fibers, sufficiently strong to retain the optical fibers in an abutment position but small enough not to damage the optical fibers by compression.

SUMMARY OF THE INVENTION

The device for connecting optical fiber comprises a ferrule and end caps with wire centres of which the extremities are located at middle of the ferrule length; said ferrule comprising a bore that traverses the central axis of the ferrule, a middle portion or "centerer", connecting clamp means at the free ends of the ferrule, linked together by the "centerer"; the ferrule being made of any material that has the property of Shape Memory Material (SMM) and deformation equipment allowing for its implementation.

Unless otherwise indicated herein, in the present document "device" refers to the device that connects optical fibers.

BRIEF DESCRIPTION OF THE FIGURES

Reference will now be made by way of example to the accompanied figures, showing articles made according to the preferred embodiments of the present invention.

FIG. 5 is a perspective view of the tool showing the opening of the "centerer" on the ferrule.

FIG. 6 illustrates the placement of the first fiber.

DETAILED DESCRIPTION OF THE PREFERRED EMBODIMENTS

The present invention will now be described more fully hereafter with reference to the accompanying drawings in which preferred embodiments are shown.

A. Device Embodiment

The device for connecting optical fibers comprises a ferrule and may be made from any suitable material such as either a polymer based material, metallic alloy or ceramic or any material that has the property of pseudo elasticity for its implementation, thus, it must be a Shape Memory Material (SMM). The Shape Memory Material may be any as described above, with desired properties. The Shape Memory Material may be a ceramic, a polymeric or a metallic alloy such as copper based or iron based alloy, or it can be a nickel/titanium alloy. The composition of the Shape Memory Material (SMM) may be more complex and include other elements in variable quantities.

The Shape Memory Material (SMM) is advantageously at an application temperature >Af for the realization of an optical-fiber connecting ferrule. In effect, in this phase, it has deformation capabilities, referred-to as pseudo-elastic, which are more important than the elastic-deformation capacities of a metallic or ceramic alloy that does not have the properties of pseudo-elasticity.

Figure 1:
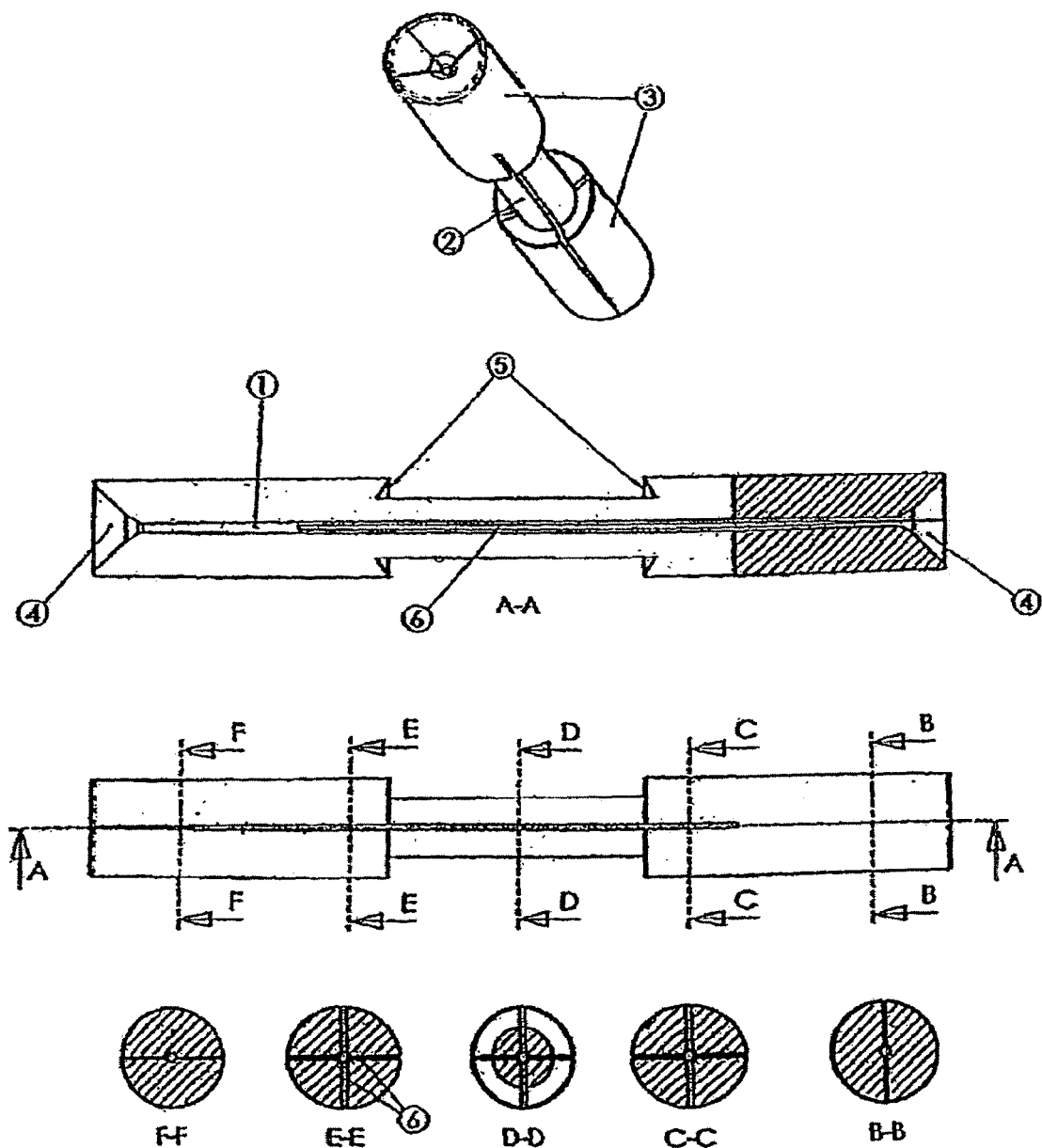
FIG. 1 is a perspective view of the ferrule in accordance with the present invention.

The ferrule is generally cylindrical and, before its first connection to optical fiber, it is characterized by the elements described in FIG. 1, namely: a bore (1) that traverses the central axis of the ferrule, from one end to the other end, with respect to the present invention, this bore (1) has the very specific characteristic in that it must be slightly smaller in diameter than the cladding diameter of the optical fibers to be connected; a middle portion (2), commonly referred to as "centerer" and connecting clamps (3). With respect to the present invention, this "centerer" (2) has the function (a) to centre, without any radial distortions, the ends of the two optical fibers from which the buffer as been retrieved on the desired length. Centering of the unbuffered glass fibers ensures that the two fibers cores are face to face with the minimum of misalignment in order to obtain an optimal optical signal transmission; and (b) to maintain the two optical fibers in contact with each other with an axial strength predisposition in order to ensure minimal attenuation and reflections at their junction, particularly, in order to counter the effects of a thermal expansion of the ferrule or traction on the optical fibers. This maintenance is advantageously obtained by an axial extension of the "centerer" (2) ferrule's with the aid of a tool, as described later. After the "centerer" (2) is relaxed, it tends to naturally contract, maintaining the two fibers in contact and under pressure on each other.

At each end of the ferrule, the connecting clamps (3) are linked together by the "centerer" (2). Each of the connecting clamps (3) resting in a closed state making the diameter of the ferrule's bore smaller than the diameter of the optical fibers to be connected. With respect to the present invention, the connecting clamps (3) are designed to be independently opened by a tool, as hereinafter described, so that one can introduce unbuffered fibers to the "centered" (2), alternatively from one side, and then the other side of the ferrule. When tool releases the connecting clamps (3), it closes on the cladding of the fiber to maintain the fiber firmly in position.

With respect to the present invention the connecting clamps (3) have the function of firmly holding each of the two fibers in the ferrule in a way such that the contraction of the "centerer" (2), once released by the tool, allows for the compression of one fiber against the other.

When both connection clamps (3) have been released, they firmly maintain the two optical fibers to be connected. Then the tool will release the "centerer" (2) so that it centres the two fibers, and it contracts to press optical fibers on each other.

Figure 2:
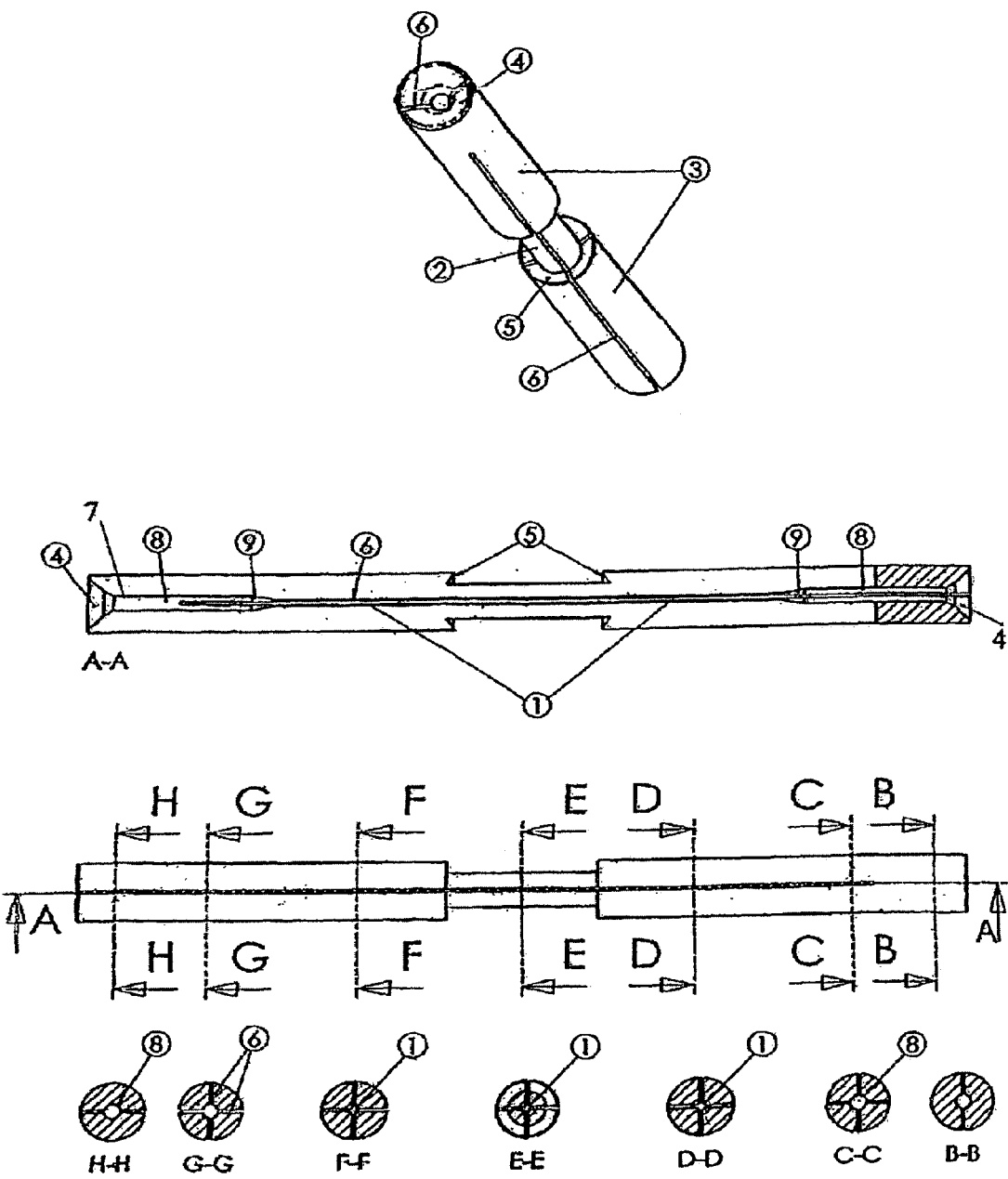
FIG. 2 is a perspective view of a second realisation of a ferrule in accordance with the present invention.

As shown in FIG. 2: each connecting clamp may be prolonged by a portion: buffer fixers (7) comprising a central bore (8) with a diameter a slightly smaller than the diameter of the buffer of the fiber.

Thus, the buffer fixers (7) will restrain the buffered part of the fiber to avoid breaking or failure at the junction between buffered and unbuffered fibers.

Junction between fiber bore (1) and buffer bore (8) will advantageously be done by a conical portion (9).

In a preferred embodiment, end cones (4) are located at the extremities of the ferrule to allow the opening of each clamp and to easily allow for the smooth insertion of the optical fibers. In a preferred embodiment, conic grooves (5) are located on each side of the "centerer" (2) to facilitate its expansion by the tool.

With respect to the present invention, the ferrule has one of more pairs of longitudinal slots (6) that cut the diameter of the ferrule, traversing radially outward from the centre. Each slot (6) cuts the ferrule from one extremity, traversing the length of the "centerer" (2) and stopping at a point between the centerer (2) and the opposite extremity. FIGS. 1 and 2 shows an example realisation with four longitudinal slots (6), comprising one set of two slots (6) at 90° to the other set of slots (6). One set of the two slots (6) cut the ferrule longitudinally outward from the opposite end of the other set of slots (6), to allow a better opening of the "centere" (2) and of the two connection clamps (3). This illustration is not restrictive in terms of the number of slots (6). Cuts B to F visually illustrate the location of the slots (6) along the length of the ferrule. With respect to the present invention, these slots (6) operate to allow for sufficient deformation of the bore (1) to freely and reproducibly insert the optical fiber while conventional industrial means are used to make the bore (1).

Figures 3, 4:
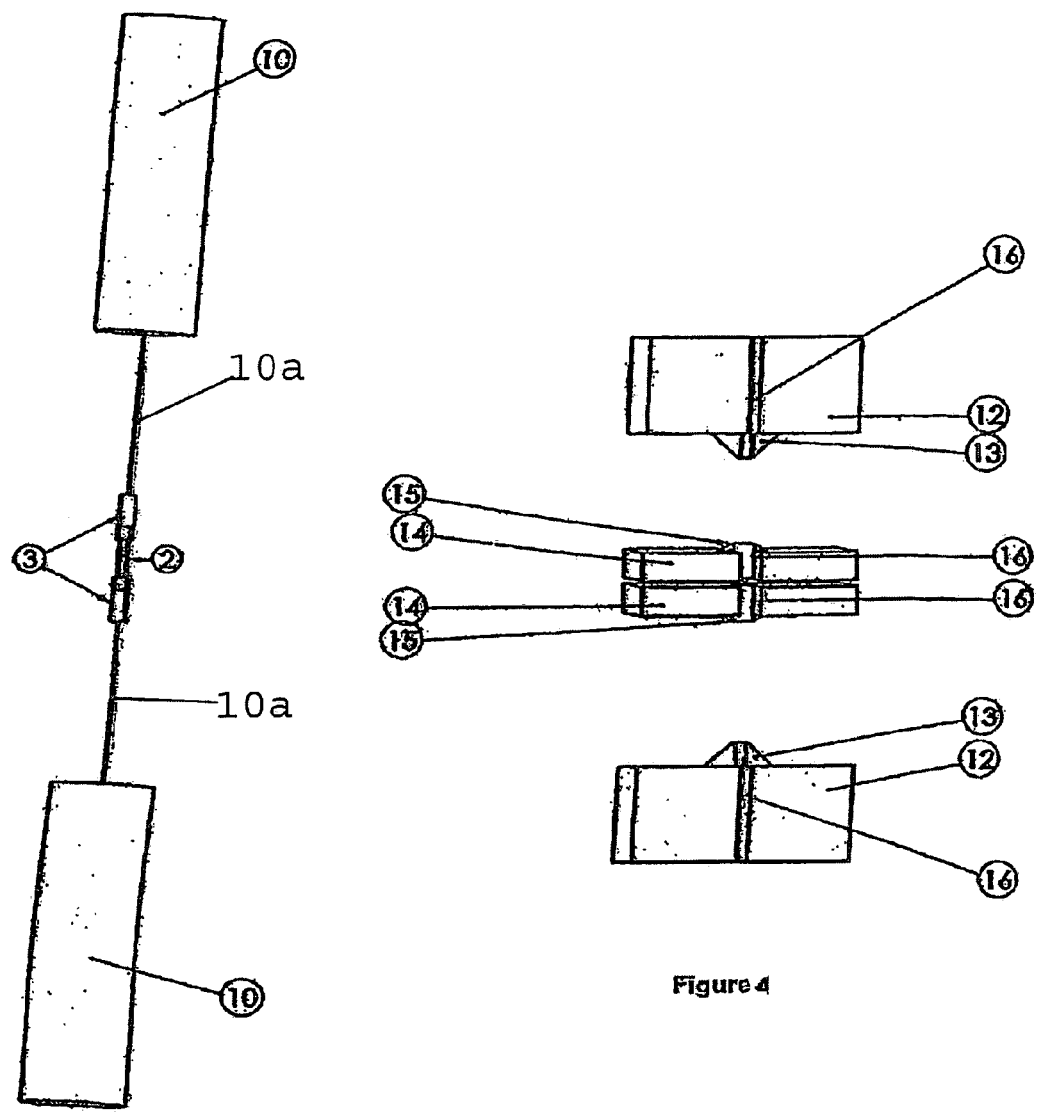
FIG. 3 is a perspective view of the ferrule and its plugs in accordance with the present invention.
FIG. 4 is a perspective view of the tool in accordance with the present invention.

With respect to the present invention, the bore (1) of the ferrule is protected by two caps (10), as shown in FIG. 3, in order to prevent contamination by dust or any other substances. These two caps (10) have wire centres (10*a*) whose extremities touch one another in the middle of the "centerer" of the ferrule, to allow for optimal positioning of optical fibers when replaced by them.

B. Use of the Ferrule

The ferrule will be used with a tool shown in FIG. 4 that can deform it in order to put the optical fibers in place.

Only the basic functions for operation when used with the tool are described. The figures are presented only as an example and are not intended to limit the scope of possible implementation of the tool. For example, grip pliers, automated and motorized tools, tools built in and around each ferrule as a part of the connector, etc.

In one embodiment, this tool comprises:

A pair of external grips (12), each of the said external grips comprises a cone (13) that engage in the end cones (4) of the ferrule.

A pair of internal grips (14) that engages in the conic grooves (5) of the "centerer" (2) of the ferrule. Each of external grips (12) and internal grips (14) comprises a passage (16) that allows the tool to fit the ferrule and its cap wires (10) on the tool. For example, this passage can be a circular hole or a side passage as shown on the FIG. 4.

a) Deformation of the "Centerer": FIG. 5

As shown in FIG. 5*a*, the ferrule is placed on the two cones (15) (shown on FIG. 4) of the internal grips (14). The two cones (15) engages each of the conic grooves (5) of the ferrule's "centerer" (2). As shown in FIG. 5*b*, tension is applied between the two internal grips (14) to deform the "centered" (2). This deformation can be broken down into two components: one consisting of the elongation (18) of the "centerer" (2) and another one consisting of the deformation (19) of the bore's diameter making it larger than the diameter of the fibers to be connected.

Usually, when one elongates a cylindrical part, the diameter of this part will shrink. Shape Memory Materials have the same behaviour.

The slots (6) that divide the "centerer" (2) allow the advantageous combination of the expansion of the "centerer" (2) with an increase in diameter of the bore (1) through the reaction obtained by the two conic grooves (5) of the "centerer" (2).

In this way, the slot or slots (6) in the "centerer" (2) allow for the enlargement of the bore's (1) diameter combined with the expansion of the "centerer" (2).

b) Placement of the First Fiber: FIG. 6

Elongation (18) of the "centerer" (2) and deformation (19) of the bore (1) are maintained. The cone (13) on the tool of a first external grip (12) is inserted in an end cone (4) of the ferrule. A force (20*a*) is applied between the external grip (12) and the corresponding internal grip (14) on the same side of the ferrule (see FIG. 6*a*). This force opens the connecting clamp (3) by using the force obtained from the end cone (4) and conic groove (5). The opening of the connecting clamp (3) is such that the bore (1) diameter becomes larger than the diameter of the optical fibers.

Once the first connecting clamp (3) is opened, the cap wire (10*a*) is removed and replaced with the first optical fiber (17), as shown in FIG. 5*a*, which had been previously prepared. The fiber (17) is abutted against the end of the second cap wire (10*a*), which is still in place. In this way, the junction between the fibers will be made at the middle of the ferrule. Preparation of the fibers comprises removal of the buffer and cleaving the fiber (17). The first external grip (12) is then relaxed so that the first connecting clamp (3) closes on the fiber and maintains it in place (see FIG. 6*c* with strength (22)).

c) Placement of the Second Fiber: FIG. 7

Strength (18) and deformation (19) of the bore (1) are still maintained.

The second external grip (12) is brought close to the ferrule and its cone (13) is engaged with the end cone (4) located on the ferrule. A force (20*b*) is applied between the external grip (12) and the corresponding internal grip (14) on the same side of the ferrule (see FIG. 7*a*). This force opens a second connecting clamp (3), as represented by arrows (23). The opening of the connecting clamp (3) is such that the bore (1) diameter is larger than the diameter of the optical fibers. After opening the second connection clamp (3), the cap wire (10*a*) is removed.

Figure 7A:
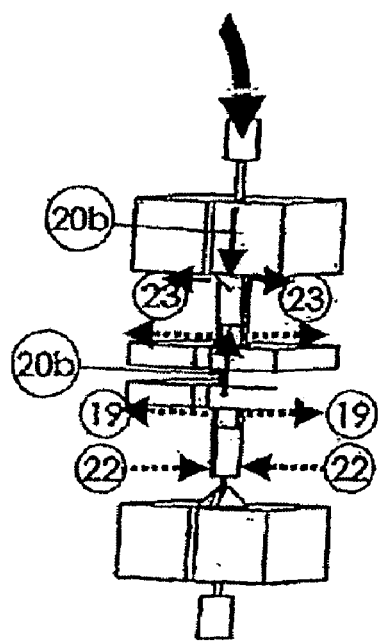
FIG. 7 illustrates the placement of the second fiber.
Figure 7B:
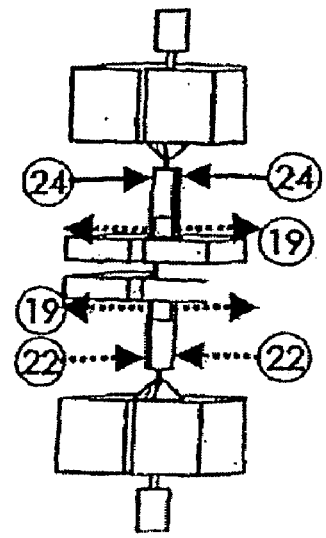
Figure 8:
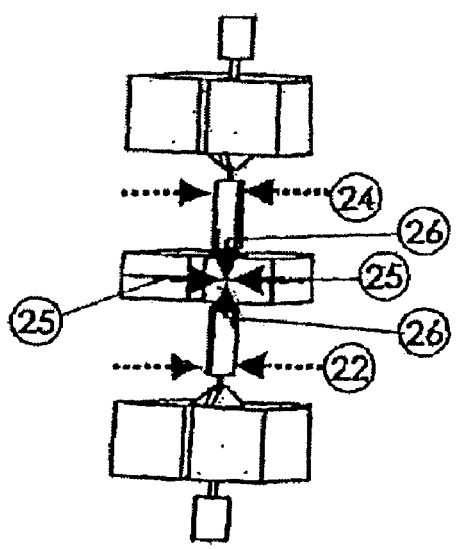
FIG. 8 illustrates the removal of the tool.
Figure 9:
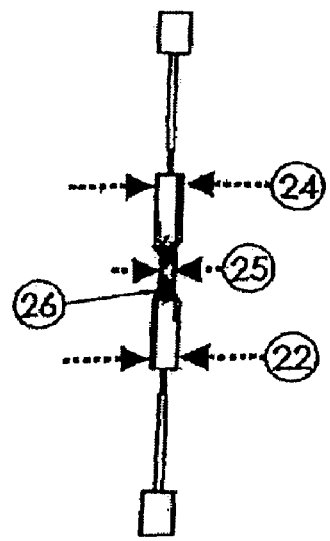
FIG. 9 illustrates the strengths exerted by the ferrule on the two connected optical fibers.

The second fiber is abutted against the end of the first fiber, which is already in place (see FIG. 7*a*). The second external grip (12) is then relaxed so that the second connecting clamp (3) closes on the fiber and maintains it in place (see FIG. 7*b* with strength (24).

d) Closing of the Ferrule: FIG. 8

The strengths (22) and (23) are maintaining the two fibers abutted.

Then the relaxation of both internal grips (14) will suppress the "centerer" (2) elongation (18) and result in a suppression of the deformation (19) of the bore in the region of the "centerer" (2). Thus, the "centerer" (2) is applying a radial force (25) on the two fibers leaving no "play" between the fibers and the ferrule. The two optical fibers are therefore perfectly centred with respect to each other.

As strength (22 and 23) is relaxed, the "centerer" (2) is no longer maintained in traction, its length tends to contract and the two fibers are abutted with a strength (26) on each other. This compression allows for the contact of the two fiber ends to be maintained even under the effect of tensile strength exerted on one of the two fibers or the effective thermal expansion of the ferrule. The tool may then be left in place if it is integrated with the ferrule, or it is removed from the connection (see FIG. 8) by passages (16).

A ferrule comprising buffer fixers (7) as represented in FIG. 4 will be used exactly in the same way as the description of portion B—use of the ferrule. The connecting clamps (3) will exert strength on the fiber cladding and also on the fiber buffer.

This will reinforce optical fiber junction in the case of risks that fibers will be bent or submitted to tensile strength.

C. Reuse of the Ferrule

The ferrule of the present invention may be removable. In order to remove the fibers, the same deforming tool used to create the junction can be used. In a particular embodiment, using the two internal grips (14) and cones (15), the "centerer" (2) is "bent" to relax the contact pressure between the two fibers and to open the bore (1). Then, using a first external grip (12) and its cone (13) the bore (1) is expended at the level of the first connecting clamp (3). Thus making it possible to remove the first fiber.

A first cap wire (10*a*) is then reinserted into the bore (1), allowing it to abut with the second fiber. The first external grip (12) is released to fix the cap wire (10*a*) into the ferrule. A similar operation is repeated to the second external grip (12) and its cone (13) in order to expand the bore (1) at the level of the second connecting clamp, thus making it possible to remove the second optical fiber and then the second cap wire (10*a*) is inserted. The second connecting clamp (3) and the two internal grips (14) are then relaxed, and the ferrule may then be reused to make another optical junction or connection.

It is to be understood that the various features of the present invention might be incorporated into other types of ferrule devices, and that other modifications or adaptations might occur to workers in the art and it is to be understood that the invention is not to be limited to the specific embodiments disclosed and that modifications and other embodiments are intended to be included within the scope of the appended claims. All such variations and modifications are intended to be included herein as being within the scope of the present invention as set forth. Further, in the claims herein, the corresponding structures, materials, arts and equivalents of all means or step-plus-function elements are intended to include any structure, material, or acts for performing the functions in combination with other elements as specifically claimed.

I claim:

1. A device for optically connecting two coaxially opposingly disposed optical fibers for the purpose of transmission of an optical signal, the-device comprising a ferrule said ferrule comprising:
   a) a longitudinally extending cylindrical body made of Shape Memory Material (SMM), said body having a middle portion, said middle portion having a first end and a second end, a first connection clamp and a second connection clamp, said connection clamps being located on either end of said middle portion, each connection clamp having a free end associated therewith, said body and said connection clamps also having a bore that traverses a central axis through said connection clamps and said middle portion, said bore having a diameter slightly smaller than the diameter of the optical fibers to be connected,
   b) said body also having one of more pairs of longitudinal slots that traverse the diameter of said body, each of said pair of slots beginning within a connection clamp and extending to the free end of the other connection clamp and,
   c) a first cap and a second cap comprising a wire whose diameter is approximately the same as the diameter of the optical fiber, such that when inserted into said bore of said body from each side, said cap wires penetrate into the ferrule from each side, and abut each other at the middle of the length of the body of the ferrule.

2. The device of claim 1, wherein each of said connection clamps have, at their respective free ends, a conic end penetrating along the axis of each said connection clamp.

3. The device of claim 1, wherein said device has conic grooves forming a ring around the junction between the first and second connection clamp and the middle portion, said conic grooves penetrating inside the first and second connection clamps.

4. The device of claim 1 wherein said pairs of slots form an angle having a value that is between 25° and 90°.

5. A tool for deforming a device, the device according to claim 1, the tool comprising:
   a) two internal grips, each grip adapted to engage a connection clamp at the junction of the connection clamp and the middle portion of the ferrule;
   b) two external grips, each grip adapted to engage with the free end of the connecting clamps of the ferrule; and wherein, said internal and said external grips are traversed by a passage that allows optical fibers and cap wires to be removed from the ferrule or inserted in said ferrule.

6. A method of removing fibers held in the ferrule of claim 1 in order to reuse the device, the method comprising:
   a) providing a tool having two internal grips adapted to engage with the complementary sections of a central portion of connecting clamps of a ferrule, two external grips that engage with the free ends of the connecting clamps, and a central passage that allows optical fibers and cap wires to be inserted and removed from the ferrule;
   b) engaging the ferrule with the tool;
   c) actuating the tool to loosen a fiber held in the ferrule; and
   d) removing a fiber.

7. A method according to claim 6, wherein the ferrule includes conic grooves disposed in a central portion, the internal grips are shaped in a conical point for engaging complementary sections of the conic grooves, and the exterior grips engage conic ends located at the free ends of the connecting clamps.

8. A method according to claim 6 wherein the ferrule further comprises connection clamps having at their respective free ends, a conical recess coaxial with the bore of each said connection clamp, said recess for receiving the deforming tool.

9. A method according to claim 6, wherein the ferrule further comprises connection clamps having conic grooves disposed in a central portion, the conic grooves for accepting the deforming tool.

10. A method according to claim 7 wherein the ferrule further comprises connection clamps, each clamp having a free end with a conical recess coaxial with the bore of each said connection clamp, said recess for receiving the deforming tool.

11. A method according to claim 7, wherein the ferrule further comprises connection clamps having conic grooves disposed in a central portion, the conic grooves for accepting the deforming tool.

12. The device of claim 1, further comprising a body having a plurality of pairs of slots.

13. The device of claim 12, wherein each slot of at least a first pair of slots commences at the first connection clamp and each slot of at least a second pair of slots commences at the second connection clamp.

14. A tool for deforming a ferrule having a first connection clamp and a second connection clamp, each connection clamp having a free end and a central portion disposed at the juncture of the connection clamp and a middle portion of the ferrule, each free end having a conic recess and each central portion having a conic groove, the tool comprising:
   a) two internal grips shaped in a conical point that engage with the complementary sections of the conic grooves on the central portion of the ferrule;
   b) two exterior grips that engage with the conic ends located at the free ends of the connecting clamps of the ferrule;
   said conical point of the said internal grip and said external grips being traversed by a passage that allows optical fibers and cap wires to be removed from the ferrule or inserted in said ferrule.

15. A method for deforming a ferrule having a first connection clamp and a second connection clamp, each connection clamp having a free end and a central portion, the central portion disposed at the juncture of the connection clamp and a middle portion of the ferrule, each free end having a conic recess and each central portion having a conic groove, the method comprising the steps of:
   a) providing a tool having two internal grips adapted to engage with the complementary sections of the middle portion of the connecting clamps, two external grips that engage with the free ends of the connecting clamps, and a central passage that allows optical fibers and cap wires to be inserted and removed from the ferrule;

b) engaging the two internal grips of the tool with the ends of the middle portion of the ferrule causing the slots and the diameter of the bore to expand at said middle portion;

c) engaging a first external grip of the tool with the first connection clamp of the ferrule, to increase the diameter of the bore in the first connection clamp, d) removing the first cap wire from the first connection clamp and inserting a first optical fiber into the bore until it is abutted against the second cap wire, said second cap wire being maintained in position by the second connection clamp;

e) removing the first external grip, so that the first connection clamp on the ferrule closes on the first fiber and maintains it in place;

f) engaging the second external grip of the tool with the second connection clamp of the ferrule, to increase the diameter of the bore in the second connection clamp;

g) removing the second cap wire from the second connection clamp and inserting a second optical fiber into the bore, causing said second optical fiber to be abutted against the first optical fiber;

h) removing the second external grip from the second connection clamp of the ferrule so that the second connection clamp of the ferrule closes on the second optical fiber and maintains it in place; and i) removing the two internal grips from the ends of the middle portion of the ferrule, causing the middle portion of the bore to shrink on the optical fibers to centre them in front of each other for light transmission, and causing the length of the middle portion of ferrule to decrease, said length decrease creating sufficient force to firmly abut the fiber ends on each other for light transmission.

16. A method according to claim 15, wherein the internal grips are shaped in a conical point for engaging complementary sections of the conic grooves and the exterior grips engage the conic ends located at the free ends of the connecting clamps.

* * * * *